US010009294B2

(12) United States Patent
Tzeng (10) Patent No.: US 10,009,294 B2
(45) Date of Patent: Jun. 26, 2018

(54) COMMUNICATION DEVICE FOR LIMITING PROCESSING OF INTERRUPT-CAUSING MESSAGES (71) Applicant: Avago Technologies General IP (Singapore) Pte. Ltd., Singapore (SG)

(72) Inventor: Shr-Jie Tzeng, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 375 days.

(21) Appl. No.: 14/737,127

(22) Filed: Jun. 11, 2015

(65) Prior Publication Data

US 2016/0337267 A1 Nov. 17, 2016

Related U.S. Application Data (60) Provisional application No. 62/162,432, filed on May 15, 2015.

(51) Int. Cl.
*H04L 12/935* (2013.01)
*H04L 12/879* (2013.01)
*H04J 3/06* (2006.01)

(52) U.S. Cl.
CPC ............ *H04L 49/30* (2013.01); *H04J 3/0661* (2013.01); *H04L 49/901* (2013.01)

(58) Field of Classification Search
CPC ....... H04L 49/30; H04L 49/901; H04J 3/0661
See application file for complete search history.

(56) References Cited

U.S. PATENT DOCUMENTS

| 5,659,758 | A | * | 8/1997 | Gentry | H04Q 11/0478 370/229 |
| 6,615,305 | B1 | * | 9/2003 | Olesen | G06F 13/24 710/262 |
| 2005/0246461 | A1 | * | 11/2005 | Accapadi | G06F 9/4812 710/200 |
| 2008/0005296 | A1 | * | 1/2008 | Lee | H04L 47/20 709/223 |
| 2010/0306433 | A1 | * | 12/2010 | Shimada | G06F 13/24 710/264 |
| 2010/0332698 | A1 | * | 12/2010 | Muller | H04L 49/90 710/57 |

* cited by examiner

*Primary Examiner* — Nimesh G Patel
(74) *Attorney, Agent, or Firm* — Sterne, Kessler, Goldstein & Fox P.L.L.C.

(57) ABSTRACT

A system and method for limited the processing of interrupt-causing messages within a communication device. A user is able to set various values for dictating the bounds of a leaky bucket processor. The leaky bucket maintains and monitors a count, and dictates whether message processing is permitted or prohibited based on the count. When a message is processed, the count is decremented. When a predetermined time passes without processing a message, the count is incremented. If the count ever reaches a predetermined low threshold value, message processing is prohibited for a predetermined time On the other hand, if the count returns to a predetermined high threshold value, processing is permitted.

20 Claims, 6 Drawing Sheets

COMMUNICATION DEVICE FOR LIMITING PROCESSING OF INTERRUPT-CAUSING MESSAGES

CROSS-REFERENCE TO RELATED APPLICATIONS

The present invention claims the benefit of U.S. Provisional Application No. 62/162,432, filed May 15, 2015, which is incorporated herein by reference in its entirety.

BACKGROUND

Field

This application relates generally to limiting the processing that a communication device will devote to interrupt-causing messages and/or signals.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

For purposes of this discussion, the term "module" shall be understood to include at least one of hardware (such as one or more circuit, microchip, or device, processor, or any combination thereof), firmware, or computer instructions, and any combination thereof. Computer instructions may be stored in a memory associated with the processor(s), that when executed by the processor(s) perform the associated function defined by the instructions. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

Timing and frequency synchronization among network entities can be used to improve network performance. In exemplary embodiments of the present disclosure, the synchronization of network entities can be implemented using, for example, the Precision Time Protocol (PTP). The PTP is further defined in the Institute of Electrical and Electronics Engineers (IEEE) 1588 protocol, which is incorporated herein by reference in its entirety.

The IEEE 1588 protocol utilizes packet exchanges between network entities (network nodes). In peer-to-peer network configurations, the one or more of the network entities can be defined as a first peer node, a second peer node, etc. In Wide Area Network (WAN) and/or Local Area Network (LAN) configurations, the network entities can be defined as peer nodes, or as a master/slave (also referred to as master nodes and slave nodes, respectively). In operation, a peer node can be configured to synchronize its clock to the clock of another peer node. To enhance fault tolerance, an election process may determine one among a plurality of other peer nodes to provide the accurate clock at any particular instant to the peer node. In master/slave configurations, the node that is selected to provide the accurate clock is referred to as a grandmaster (GM) node. The clock of the grandmaster can be referred to as the "grandmaster clock."

In IEEE 1588 protocol implementations, network interfaces (e.g., ports) of the network nodes can be configured to take accurate timestamps of selected packet ingress and/or egress packets, and to manage synchronized time. To improve accuracy of synchronization, timestamps can be generated at, for example, the edge of the physical (PHY) layer for the network interface(s) before the packet is transmitted to (or received from) another network node via the network medium (e.g., communication channel). In this example, by reducing time between when a timestamp is generated and when a corresponding packet is transmitted by the network node (or received by the network node), the accuracy of the timestamp can be increased.

In implementations with one or more intermediate network nodes between two network nodes performing synchronization (e.g., where packets traverses multiple hops from a source to a destination), the network nodes can be configured to determine packet queuing delays at the intermediate nodes. In these examples, the intermediate node(s) can be configured to utilize a transparent clock (TC) to measure the residence time (e.g., the. queuing delay) that the packets experience at the intermediate node itself, and may record that residence time in respective packets. In operation, the destination network node can be configured to utilize the residence time information within the received packet to eliminate any synchronization error attributable to the queuing delay of the intermediate node(s).

Exemplary embodiments of the present disclosure provide for timing synchronization between network entities (e.g., peer nodes) connected to a network. One or more exemplary embodiments can conform to the PTP and/or IEEE 1588 protocol in a packet-switched network. In an exemplary embodiment, the egress timestamp of an outgoing message can be saved in a memory associated with the physical interface through which the message egresses, and upon receiving a response message corresponding to the transmitted message, the saved egress timestamp is recorded in the header of the response message before the response message is passed up the protocol stack. The egress timestamp corresponds to the time the message is transmitted on the physical network medium from the physical interface. A similar process can be performed for ingress timestamps of an incoming message, where an ingress timestamp corresponds to the time the message is received. In operation, the egress and/or ingress timestamps can be inserted in, for example, a field in the header of selected protocol packets so that it can be communicated inband. By storing the egress and/or ingress timestamps in the header, the exemplary embodiments can reduce and/or eliminate the utilization of one more of host interfaces—such as, for example, a Media Independent Interface (MII) and/or a Management Data Input/Output (MDIO) interface—to access a memory associated with the physical interface to obtain one or more timestamps. Timing synchronization between network entities is discussed in more detail in U.S. patent application Ser. No. 13/722,985, filed Dec. 20, 2012, which is incorporated herein by reference in its entirety.

Figure 1:
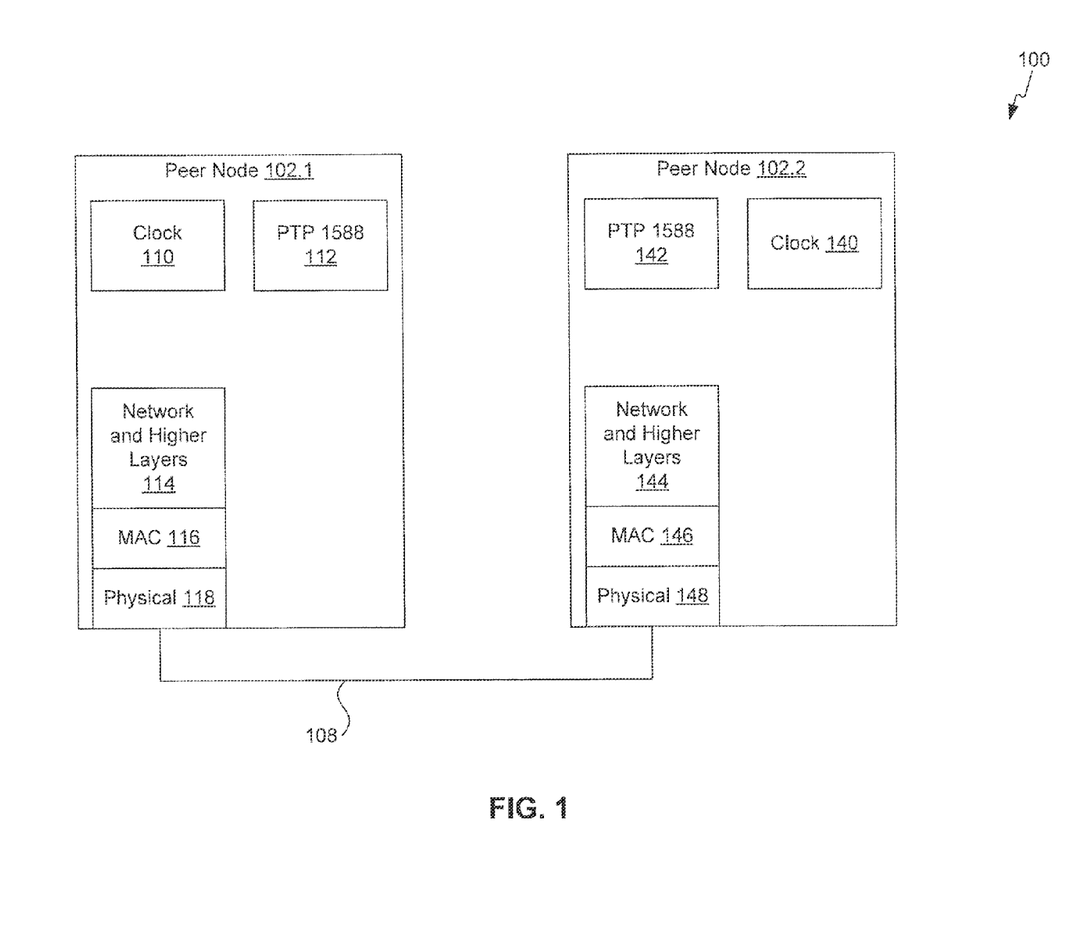
FIG. 1 illustrates a system for synchronizing time between network entities according to an exemplary embodiment of the present disclosure.

FIG. 1 illustrates a system 100 for synchronizing time between network entities according to an exemplary embodiment of the present disclosure. The system 100 includes peer node 102.1 communicatively coupled to peer node 102.2 via network 108.

In exemplary embodiments, peer node 102.1 is configured to synchronize clock 110 of peer node 102.1 with clock 140 of peer node 102.2 and/or peer node 102.2 is configured to synchronize clock 140 of peer node 102.2 with clock 110 of peer node 102.1. Clock 110 and/or clock 140 may be based upon a Global Navigation Satellite Systems (GNSS) clock, a master clock, a grand master clock, and/or one or more accurate network clocks as would be understood by those skilled in the relevant art(s). Peer node 102.1 and/or peer node 102.2 may include, for example, a GNSS receiver (not shown) and GNSS clock adjust circuitry (not shown), which may be used by peer node 102.1 and/or peer node 102.2 to keep their respective clocks 110 and/or 140 in synchronization with an accurate external GNSS clock. Clock 110 and clock 140 can each include circuitry, logic and/or code that are configured to generate one or more clocks having corresponding clock frequencies. For example, clocks 110 and/or 140 can include electronic oscillator circuitry, such as, for example, crystal oscillator circuitry, and/or a phase lock loop (PLL).

Network 108 can include one or more well-known wired and/or wireless communication mediums and/or one or more well-known communication components—such as one or more network switches, network routers, network gateways, wireless access points, network modems, servers, databases, and/or computers to provide some examples.

Peer node 102.1 can include a network protocol stack including a physical (PHY) layer 118, a media access control (MAC) layer 116, and a network layer 114. The peer node 102.1 can also include one or more higher layers, such as a transport layer, a session layer, a presentation layer, an application layer, and/or one or more other layers defined in, for example, the Open Systems Interconnection (OSI) model.

The network layer 114 can include one or more processors, circuitry, logic and/or code that are configured to process internet protocol (IP) communications-such as routing, switching, and/or forwarding communications—and/or one or more other Layer 3 operations as defined in the OSI model.

The MAC layer 116 can include one or more processors, circuitry, logic and/or code that are configured to process packet headers, perform one or more addressing operations, perform one or more channel access control operations, and/or one or more other Layer 2 operations as defined in the OSI model.

The physical (PHY) layer 118 can include one or more processors, circuitry, logic and/or code that are configured to process one or more packets, perform transmission and/or reception of one or more packets, interface with one or more communication mediums, and/or to perform one or more other Layer 1 operations as defined in the OSI model. Accordingly, the PHY layer 118 can include a transmitter and receiver to transmit and receive packets. In an exemplary embodiment, the processing of packets by the PHY layer 118 can include the generation of one or more timestamps by the PHY layer 118. The timestamp generation can be in response to one or more events, such as, for example, the receipt/transmission of a PTP message and/or the receipt/transmission of one or more data packets.

Peer node 102.1 can also include a Precision Time Protocol (PTP) device 112, which can include one or more processors, circuitry, logic and/or code that are configured to generate and/or process one or more messages, perform timestamping of ingress and/or egress packets, classify one or more packets, and/or perform one or more synchronization operations to maintain synchronization of clock 110 with one or more other clocks, such as clock 140. In an exemplary embodiment, the PTP device 112 can be configured to determine a residence time of packets and/or update one or more timestamps of one or more ingress and/or egress packets. In an exemplary embodiment, the PTP device 112 can be configured to process one or more packets to conform to the Precision Time Protocol (PTP) as defined in the IEEE 1588 protocol. For example, the PTP device 112 can be configured to, for example, generate and/or process one or more messages, classify one or more packets, and/or perform timestamping of ingress and/or egress packets, to conform to the Precision Time Protocol (PTP).

In operation, one or more of the clock 110, the Precision Time Protocol (PTP) device 112, the network layer 114, the media access control (MAC) layer 116, and the physical (PHY) layer 118 of the peer node 102.1 can be configured to operate in combination with one or more of the other components to synchronize and/or maintain synchronization of clock 110.

Peer node 102.2 can include a clock 140, a Precision Time Protocol (PTP) device 142, a network layer 144, a media access control (MAC) layer 146, and a physical (PHY) layer 148. These components are similar to, and can be configured to perform similar functions as, the clock 110, the Precision Time Protocol (PTP) device 112, the network layer 114, the media access control (MAC) layer 116, and the physical (PHY) layer 118 of the peer node 102.1, respectively.

Figure 2:
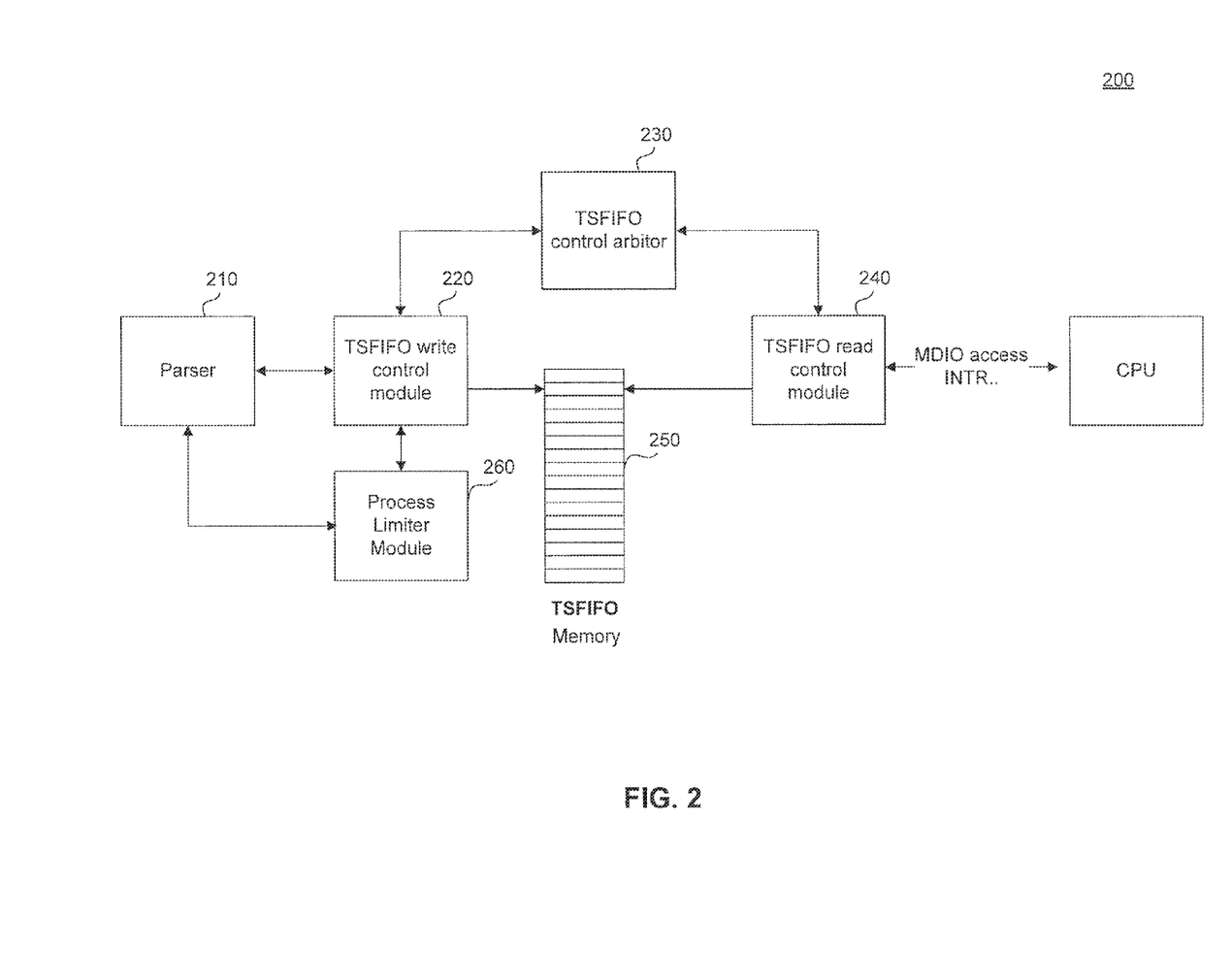
FIG. 2 illustrates a block diagram of an exemplary 1588 module that may be used in the system.

FIG. 2 illustrates a block diagram of an exemplary 1588 module 200 that is one embodiment of PTP 1588 device 112 and/or 142 within the system 100. The 1588 module includes a parser 210, a Timestamp First In First Out (TSFIFO) write controller 220, a TSFIFO control arbiter 230, a TSFIFO read controller, and a TSFIFO memory 250.

As part of the 1588 protocol implementations, each incoming or outgoing packet is checked by the parser 210 to determine if it is a 1588 packet. The parser 210 performs this function based on the headers of the packets. If the parser 210 determines that the packet is a 1588 packet, the TSFIFO write controller 220 causes the packet to be stored in the TSFIFO 250. The TSFIFO control arbiter 230 examines stored packets in the order that they were stored. If a particular packet does not include a valid timestamp, the TSFIFO control arbiter 230 discards the packet without taking further action. Alternatively, if the TSFIFO control arbiter 230 determines that the packet includes a valid timestamp, the TSFIFO arbiter causes the TSFIFO read control module 240 to assert an interrupt to the CPU via the management data input/output (MDIO).

The assertion of the interrupt informs the CPU that runs 1588 stack that there is valid timestamp information that requires processing. This causes the CPU to stop processing of general packets in order to retrieve the timestamp information. The CPU causes the MDIO process to retrieve the timestamp from the TSFIFO 250. The interrupt remains asserted until there is not a valid timestamp stored in the TSFIFO 250. Only then is the CPU able to move on to other mission critical tasks.

Conventionally, 1588 systems did not include any functionality for limiting the amount of processing that could be utilized toward the processing of 1588 packets. While such a configuration was adequate for normal 1588 traffic, it was vulnerable to crippling attacks. Specifically, an attacker could debilitate the communication device's ability to perform critical tasks by overloading the device with 1588 packets. This would keep the device in a constant state of interrupt, thereby essentially rendering the device unsuitable for use.

Therefore, an embodiment of the present disclosure includes additional system configurations in the form of a process limiter module 260 for limiting the amount of available 1588 packet processing in order to increase the general functionality of the device and to prevent such 1588 attacks. It should be understood that, while the discussions contained herein are discussed with respect to 1588 packets and processing, the same or similar descriptions are applicable to other messages that are capable of causing interrupts within the wireless communication device.

Figure 3:
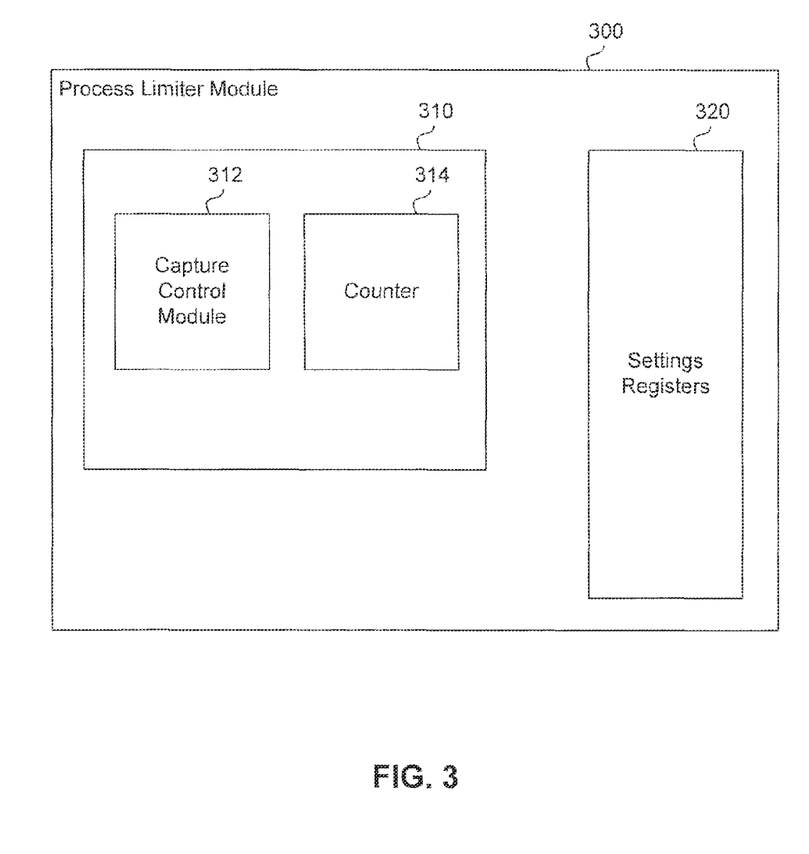
FIG. 3 illustrates a block diagram of an exemplary process limiter module that may be used within the 1588 module.

FIG. 3 illustrates a block diagram of an exemplary process limiter module 300. The process limiter module 300 includes a leaky bucket module 310 and settings registers 320, and may represent an exemplary embodiment of the process limiter module 260. The leaky bucket module 310 includes a capture control module 312 and a counter module 314 that operate to limit the processing that can be devoted to 1588 packets.

The counter module 314 of the leaky bucket module 310 tracks a number of timestamps that are permitted to be captured from incoming 1588 packets based on various settings located in the settings registers 320. The settings registers 320 includes a number of configurable settings for dictating the manner in which 1588 packets are processed, and how such processing is limited. Table 1, below, provides a listing of exemplary registers that can be employed within the leaky bucket module 310.

TABLE 1

| Register Name | Register Type | Default Value | # Bits | Description |
| --- | --- | --- | --- | --- |
| En_TSCAP_RATE | R/W | X'0 | 8 | When asserted, TS capture rate control enhancement is enabled. When dis-asserted, TS capture rate control enhancement is disabled. |
| TSCAP_RATE_SEL | R/W | X'0 | 3 | This sets the rate at which the system can capture 1588 messages b000: 2 captures/sec b001: 4 captures/sec b010: 8 captures/sec b011: 16 captures/sec b100: 32 captures/sec b101: 64 captures/sec b110: 128 captures/sec b111: 256 captures/sec |
| Watermark_H | R/W | X'01100 | 5 | The high water mark: sets the "capture enable" bucket level |
| Watermark_L | R/W | X'00010 | 5 | The low water mark: sets the "capture disable" bucket level |
| Force_cap_on | R/W | X'0 | 1 | Force system to a "capture enabled" state |
| Force_cap_off | R/W | X'0 | 1 | Force system to a "capture disabled" state |

The registers listed in Table 1 are preferable per port registers, and can be designed to be user or manufacturer-configurable. Each of the listed registers set a corresponding configuration of the leaky bucket module 310. For example, the En_TSCAP_RATE register enables or disables the use of the leaky bucket module 310. When dis-asserted, the capture control module 312 indicates a permanent "capture enabled" state, until the En_TSCAP_RATE is asserted. This allows the system to operate in a conventional manner without use of the leaky bucket module 310. In this mode, 1588 messages are processed as normal, without processing limitation.

The TSCAP_RATE_SEL register sets the rate at which 1588 messages can be processed, when processing is permitted by the leaky bucket module 310. Table 1 shows several different values that can be set to the register, each of which corresponds to a different capture rate. During operation, the capture control module 312 includes a sub-counter (not shown) that tracks a number of 1588 messages that are processed within a given period of time (e.g., 1 second). When the number of processed 1588 packets reaches the limit associated with the selected capture rate, the capture control module 312 will designate a "capture disabled" state until the end of the time period.

In an alternative embodiment, the capture control module 312 distributes the permitted captures over the time period. For example, if two captures are permitted per second, the capture control module 312 permits one capture every 500 milliseconds. In an embodiment, the sub-counter is not a separate counter, but instead is embodied through the monitoring of a digital clock, such as clock 110. For example, in an 80-bit clock signal, the least significant 30 bits may represent a free-running nano-second counter. In order to detect when a new capture is permitted, the capture control module 312 monitors for a change in the relevant bits of the clock. When the relevant bits (e.g., bit 30 for a half-second interval) change in value, the capture control module 312 determines that a new capture is permitted.

The Force_cap_on and Force_cap_off registers cause the capture control module 312 to designate a capture enabled or capture disabled state, respectively, regardless of the number of timestamps that have been captured, so that the state is forced. In an embodiment, these registers are for debugging purposes, and are typically not configured during field operation.

The Watermark_H and Watermark_L registers set the counts at which the capture control module 312 will switch from a designated capture disabled state to a capture enabled state, and from a capture enabled state to a capture disabled state, respectively. The functionality of these registers is depicted in FIG. 4.

Figure 4:
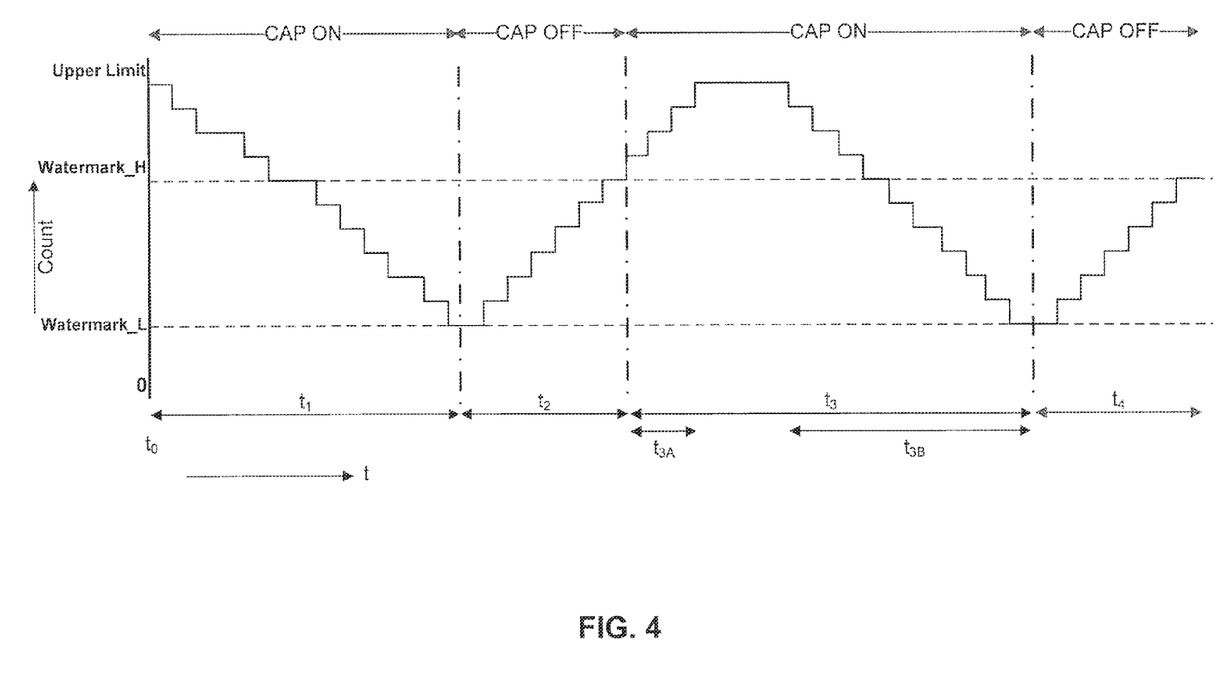
FIG. 4 illustrates a diagram of the operation of an exemplary counter module that may be used within the process limiter module.

FIG. 4 illustrates an exemplary diagram of the functionality of the counter module 314 in relation to the Watermark_H and Watermark_L register values. As shown in FIG. 4, the value of the count within the counter module 314 is initially (time $t_0$) set to a predetermined upper limit. In an exemplary embodiment, the upper limit is set to 32. Referring to FIG. 2, every time that the TSFIFO write control module 220 successfully captures a 1588 timestamp, the TSFIFO write control module 220 notifies the process limiter module 260. Referring back to FIG. 4, each of these notifications causes the counter module 314 to reduce a current count by 1. Meanwhile, the counter module 314 will increase the current count by 1 for each predetermined time that has passed without the successful capture of a 1588 timestamp. In an embodiment, the predetermined time is different during the capture enabled state than during the capture disabled state. In a further embodiment, the predetermined time is longer during the capture enabled state than the predetermined time during the capture disabled state.

When the counter module 314 decreases to the Watermark_L value, this signifies that processing of 1588 packets must be temporarily halted, and thus the capture control module 312 designates a capture disabled state. Alternatively, when the counter module 314 increases to the Watermark_H value, this signifies that new 1588 packets can be processed, and thus the capture control module 312 designates a capture enabled state.

In the example illustrated in FIG. 4, the counter module is initially set to an upper limit at time $t_0$ and the capture control module is initially set to a capture enabled state. During time $t_1$, the counter module 314 reduces the count for each 1588 timestamp that is captured in the TSFIFO 250. When the count value decreases to the Watermark_L value, as set by the Watermark_L register, the capture control module 312 switches from the initial capture enabled state to a capture disabled state. While in the capture disabled state, 1588 messages are not processed, and the counter module 314 gradually increases the count value based on the predetermined time previously discussed. This continues throughout the duration of time $t_2$ until the count increases to the Watermark_H value, as set by the Watermark_H register.

When the count increases to the Watermark_H value, the capture control module 312 transitions from the capture disabled state to the capture enabled state. Although 1588 message processing is permitted during this time period $t_3$, no messages are received in the depicted example during time period $t_{3A}$. Therefore, the counter module 314 continues to increase the count during the time period $t_{3A}$ until the count reaches the upper limit. The count remains at the upper limit until a 1588 timestamp is captured at the beginning of time period $t_{3B}$. During time period $t_{3B}$ in the example, the capturing of 1588 timestamps causes the counter module 314 to repeatedly decrease the count value. When the count decreases to the Watermark_L value, the capture control module 312 again transitions to the capture disabled state and the counter module 314 again begins to increase the count value.

By halting 1588 message processing when the bucket nears emptying (e.g., when the count reaches the Watermark_L value), and by only permitting message processing when the bucket nears full (e.g., when the count reaches or exceeds the Watermark_H value), the leaky bucket module 310 limits the amount of processing that can be devoted to 1588 messages. This not only enhances general functionality of the communication device, but protects against attacks that use message interrupts to disable communication devices.

Figure 5:
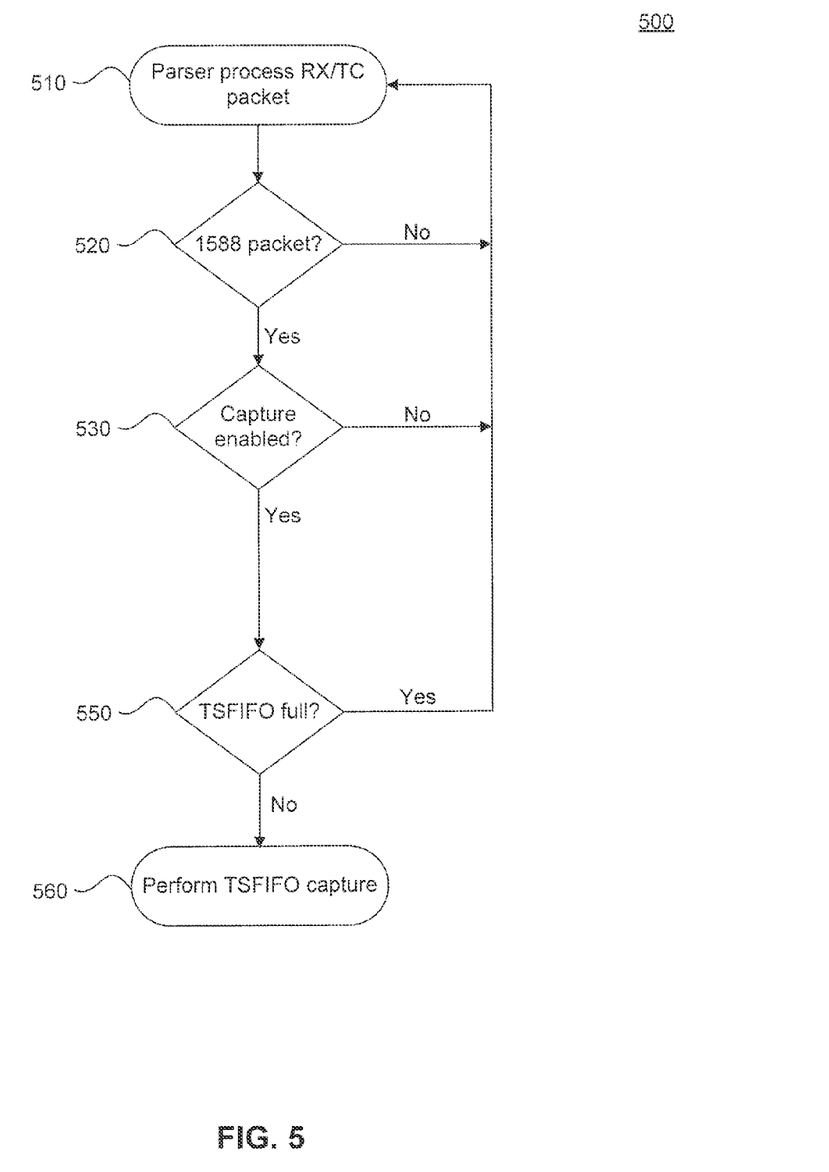
FIG. 5 illustrates a flowchart diagram of an exemplary method 500 for processing interrupt-causing messages.

FIG. 5 illustrates a flowchart diagram of a method 500 for processing 1588 messages. The method 500 will be described under the assumption that the process limiter module 260 has been initialized and is functioning in accordance with the above description. The method 500 will be described with reference to FIGS. 1 and 2.

The method 500 begins with the parser 210 receiving an incoming one or more packets (step 510). The parser 210 then makes a determination as to whether the received packet is a 1588 packet (step 520). If the parser 210 determines that the packet is not a 1588 packet (520—No), then processing returns to step 510.

Alternatively, if the parser 210 determines that the packet is a 1588 packet (520—Yes), then the parser next queries the capture control module 312 of the process limiter module 260 to determine whether 1588 capture is enabled (530). If the capture control module 312 has designated a capture disabled state (530—No), then processing returns to step 510.

Alternatively, if the capture control module 312 has designated a capture enabled state (530—Yes), then the parser 210 passes the packet on to the TSFIFO write control module 220. The TSFIFO write control module 220 performs a check to determine whether the TSFIFO is full (step 550). If the TSFIFO 250 is full (550—Yes), then processing returns to step 510. Alternatively, if the TSFIFO 250 is not full (550—No), then the TSFIFO write control module 220 initiates capture of the 1588 timestamp information (step 560).

Figure 6:
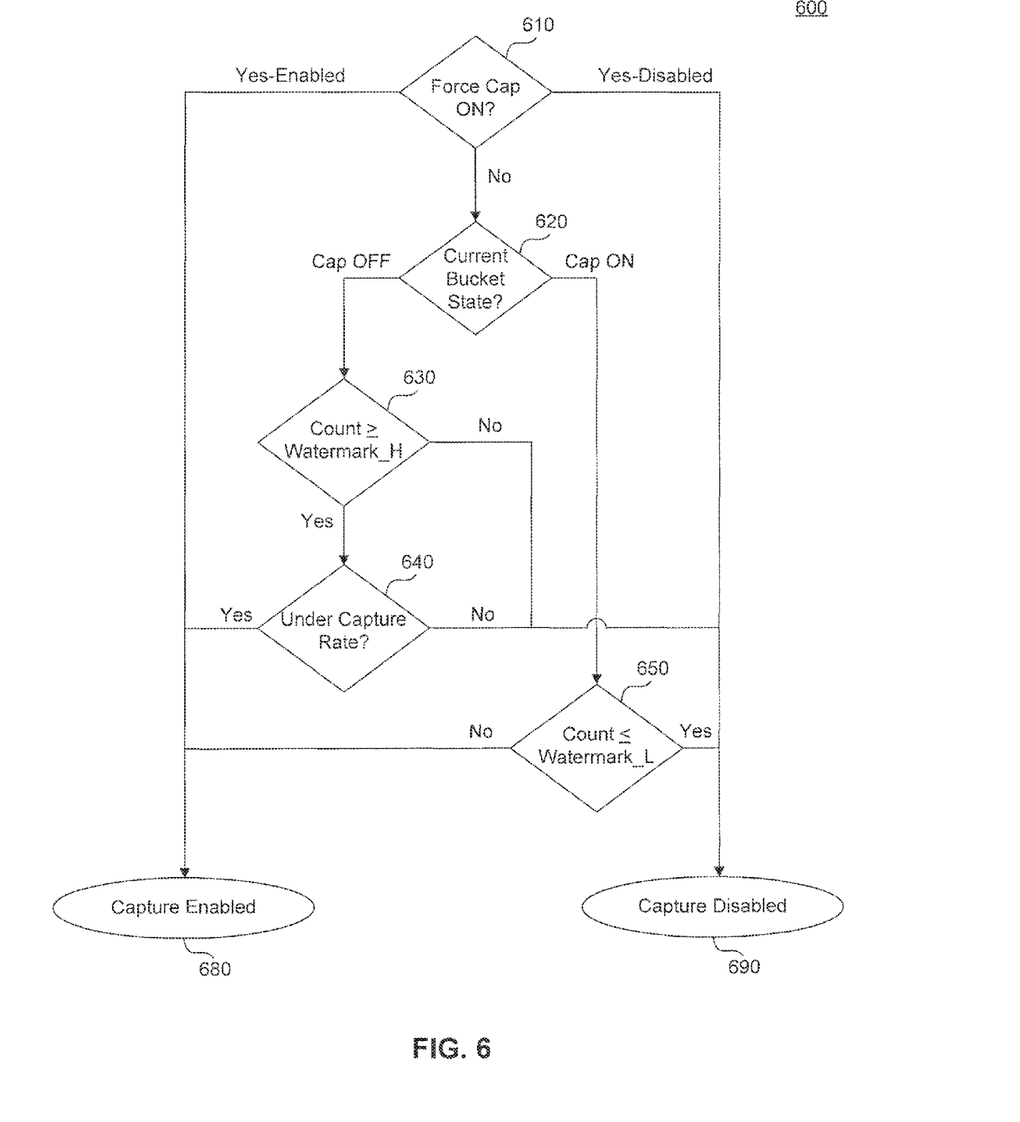
FIG. 6 illustrates a flowchart diagram of an exemplary method 600 for determining whether capture of interrupt-causing messages should be enabled or disabled.

FIG. 6 illustrates a flowchart diagram of an exemplary method 600 for determining whether capture of interrupt-causing messages should be enabled or disabled. This method described with respect to FIG. 6 describes the process by which the capture control module 312 designates a capture enabled, or capture disabled, state (step 530).

Initially, a check is made regarding whether a capture state has been forced (610). If a capture enabled has been forced (610—Yes-Enabled), then the capture control module 312 designates a capture enabled state (680). On the other hand, if capture disabled has been forced (610—Yes-Disabled), then the capture control module 312 designates a capture disabled state (690).

Alternatively, if a capture state has not been forced (610—No), then the process limiter module 260 checks the state of the leaky bucket module 310. The leaky bucket module 310 will have a current state of either Capture ON or Capture OFF, depending on the count value and the most recent threshold met. If the current state is set to Capture OFF (620—Cap OFF), then a determination is made as to whether the count is greater than or equal to Watermark_H (630). If the count is less than Watermark_H (630—No), then the capture control module 312 designates a capture disabled state (690).

Alternatively, if the count is greater than Watermark_H (630—Yes), then a determination is made regarding whether the capture rate has been exceeded (640). If the current rate of capture is less than the capture rate (640—Yes), then the capture control module 312 designates a capture enabled state (680). On the other hand, if the current rate of capture exceeds the capture rate (640—No), then the capture control module designates a capture disabled state (690).

If, on the other hand, the current state of the leaky bucket is Capture ON (620—Cap ON), then a determination is made regarding whether the current count is less than or equal to Watermark_L (650). If the count is greater than Watermark_L (650—No), then the capture control module 312 designates a capture enabled state. On the contrary, if the count is less than or equal to Watermark_L (650—Yes), then the capture control module 312 designates a capture disabled state.

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

In the prior description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, computer instructions, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; or other hardware devices. Further, firmware, routines, instructions may be described herein as performing certain actions. However, it should be appreciated that such descriptions are merely for convenience and that such actions in fact results from computing devices, processors, controllers, or other devices executing the firmware, computer instructions, routines, instructions, etc.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Abstract section, is intended to be used to interpret the claims. The Abstract section may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A system for limiting processing of interrupt-causing messages, the system comprising:
   a processing limiter module, including:
      a plurality of settings registers that store predefined settings;
      a counter module configured to maintain a count based on previously-processed messages and a first setting of the predefined settings; and
      a capture control module configured to indicate whether processing is permitted based on the count and a second setting of the predefined settings;
   a parser module configured to identify a received message as a new interrupt-causing message; and
   a write control module configured to process the new interrupt-causing message based on the indication of the capture control module,
   wherein the counter module is further configured to increment the count after a predetermined time has passed without receiving an interrupt-causing message.

2. The system of claim 1, wherein the counter module is configured to increment the count up to a predetermined upper limit value.

3. The system of claim 2, wherein the predefined settings include the predetermined upper limit value.

4. The system of claim 1, wherein the counter module is further configured to decrement the count in response to the new interrupt-causing message being processed.

5. The system of claim 1, wherein the second setting is a capture rate that defines a number of interrupt-causing messages that are permitted to be processed within a predetermined period of time.

6. The system of claim 5, wherein the first setting includes an upper threshold value and a lower threshold value.

7. The system of claim 5, wherein the capture control module is further configured to distribute the number of interrupt-causing messages over the predetermined period of time.

8. A system for limiting processing of interrupt-causing messages, the system comprising:
    a counter module configured to maintain a count based on previously-processed messages and an elapsed time since a most recent message was processed;
    a parser module configured to identify a received message as a new interrupt-causing message;
    a capture control module configured to indicate whether processing of the new interrupt-causing message is permitted based on the count; and
    a write control module configured to process or discard the new interrupt-causing message based on the indication of the capture control module,
    wherein the counter module is further configured to increment the count after a predetermined time has passed without receiving an interrupt-causing message.

9. The system of claim 8, wherein the capture control module is further configured to indicate whether processing of the new interrupt-causing message is permitted based on a number of messages that have been processed within a predetermined time period.

10. The system of claim 9, wherein the capture control module is further configured to distribute processing of the interrupt-causing messages over the predetermined period of time.

11. The system of claim 8, wherein the counter module decrements the count in response to the write control module processing the interrupt-causing message.

12. The system of claim 11, wherein, in response to the decremented count being equal to a predetermined low threshold value, the capture control module transitions from indicating that processing is permitted to indicating that processing is prohibited, and maintains indicating that processing is prohibited for a predetermined prohibition period.

13. The system of claim 12, wherein at the conclusion of the predetermined prohibition period, the capture control module transitions from indicating that processing is prohibited to indicating that processing is permitted, and
    wherein at the conclusion of the predetermined prohibition period, the count is equal to a predetermined high threshold value.

14. The system of claim 13, wherein the predetermined high threshold value is less than a predetermined maximum count value.

15. A method for limiting processing of interrupt-causing messages, the method comprising:
    identifying a received message as a new interrupt-causing message;
    determining whether processing of the new interrupt-causing message is permitted or prohibited based on a count;
    processing or discarding the new interrupt-causing message based on the determination;
    decrementing the count in response to processing the new interrupt-causing message; and
    incrementing the count in response to a predetermined time elapsing since a most-recent interrupt-causing message was processed.

16. The method of claim 15, wherein determining whether processing of the new interrupt-causing message is permitted or prohibited is based on a number of messages that have been processed within a predetermined time period.

17. The method of claim 15, further comprising prohibiting processing of the new interrupt-causing message in response to the count being decremented to a predetermined low threshold value,
    wherein the predetermined low threshold value is greater than zero.

18. The method of claim 17, wherein prohibiting of processing of additional new interrupt-causing messages remains for a predetermined prohibition period.

19. The method of claim 17, further comprising permitting processing of additional new interrupt-causing messages in response to the count being incremented to a predetermined high threshold value.

20. The method of claim 19, wherein the predetermined high threshold value is less than a predetermined upper limit.

* * * * *